United States Patent
Pfeiffer (10) Patent No.: US 7,182,024 B2
(45) Date of Patent: Feb. 27, 2007

(54) FLEXIBLE RAIL SECTION

(75) Inventor: Michael W Pfeiffer, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/081,314

(22) Filed: Mar. 16, 2005

(65) Prior Publication Data

US 2006/0207470 A1    Sep. 21, 2006

(51) Int. Cl.
*F16C 29/00* (2006.01)

(52) U.S. Cl. .................. 104/119; 384/45; 238/10 R (58) Field of Classification Search ............... 105/29.1, 105/144, 127; 198/861.2, 861.1; 104/106, 104/107, 108, 119, 130.11, 118, 93; 384/45, 384/55, 58, 50, 59; 238/10 R, 10 A, 10 B, 238/10 C, 10 E, 10 F
See application file for complete search history.

(56) References Cited

U.S. PATENT DOCUMENTS

| | | | |
|---|---|---|---|
| 1,495,595 A | | 5/1924 | Jack |
| 2,795,315 A | * | 6/1957 | Hahir et al. .............. 198/803.3 |
| 3,193,675 A | | 7/1965 | Parkes |
| 3,707,218 A | * | 12/1972 | Payne et al. ................ 198/838 |
| 4,144,965 A | | 3/1979 | Alldredge |
| RE30,454 E | * | 12/1980 | Birdsall ........................ 33/196 |
| 4,727,981 A | | 3/1988 | Johansson |
| 5,101,734 A | | 4/1992 | Sakai |
| 5,106,206 A | * | 4/1992 | Tanaka ......................... 384/45 |
| 5,108,197 A | * | 4/1992 | Morita ......................... 384/45 |
| 5,150,655 A | | 9/1992 | Sakai |
| 5,186,314 A | * | 2/1993 | Clopton .................... 198/860.2 |
| 5,232,288 A | | 8/1993 | Mottate |
| 5,839,657 A | * | 11/1998 | Fulton et al. ............. 238/10 E |
| 6,398,121 B1 | * | 6/2002 | Morgan .................... 238/10 F |
| 6,454,084 B2 | | 9/2002 | Csiki |
| 6,488,411 B2 | * | 12/2002 | Michioka et al. ............. 384/45 |
| 6,499,588 B1 | | 12/2002 | Eberle |
| 6,601,696 B1 | | 8/2003 | Zijderveld |
| 6,631,850 B1 | | 10/2003 | Wa |
| 2002/0144340 A1 | * | 10/2002 | Last ............................... 4/502 |

OTHER PUBLICATIONS

"Hoerbiger-Origa Linear Guides," www.hoerbiger-origa.com/english/products/linearfuehrungenE_new.html, printed May 5, 2004, 1 pg.

* cited by examiner

*Primary Examiner*—Mark T. Le
(74) *Attorney, Agent, or Firm*—Shumaker & Sieffert, P.A.

(57) ABSTRACT

A flexible rail section on which a carriage can be transported may include a longitudinal slot that is essentially parallel to a direction of carriage travel, wherein the flexible rail section can connect two misaligned rails. The flexible rail section may include transverse slots intersecting the flexible rail section in one or more directions. A flexible rail section on which a carriage can be transported may be made from an elastomer, wherein the flexible rail section can connect two misaligned rails.

23 Claims, 8 Drawing Sheets

FLEXIBLE RAIL SECTION

TECHNICAL FIELD

This description relates to a rail section that can connect misaligned rails.

BACKGROUND

Many of today's manufacturing procedures involve a conveyor of one sort or another, and in some systems a slide rail consisting of joined rail sections is used for moving work pieces along a manufacturing line. For example, articles may be placed on, or suspended from, carriages that travel along a rail from one work station to another. The carriages may travel continuously or may move and be stopped intermittently. For example, the carriage may be transported along a series of modular work stations, where a different operation is performed on the work piece at each station.

When precision in carriage location on the rail is important, such as in the automated production of relatively small electronic devices, the carriage typically is designed to be held in fairly close contact with the rail. For example, in some slide rail systems the rail has a specific profile allowing it to be embraced by part of the carriage during operation, such that the carriage generally cannot be lifted upward (or titled to the side) while mounted on the rail. This may be helpful in assuring that the carriage can be placed in an exact position for robotic operations on the work piece, to name just one example.

The close fit between carriage and rail may, however, also be associated with disadvantages. It becomes increasingly important that adjacent different rail sections are well aligned. If the misalignment is severe enough, it may be practically impossible to join the two rails in their current position. However, even when two misaligned rails can be joined to each other, the misalignment may cause a kink at the joint which can obstruct carriage travel. These difficulties can be troublesome in a manufacturing process involving modular work stations, when it can be difficult to precisely align adjacent work stations so that their respective rail portions can be joined. Such difficulties may arise also in non-conveyor applications, such as a component that travels over joined sections before reversing direction to return over the same sections.

It is to these and other problems that the invention is directed. For example, embodiments of the invention may offer the advantage of overcoming angular, lateral or twisting misalignments.

SUMMARY

The invention relates to a flexible rail section. In a first general aspect, a rail section on which a carriage can be transported has a longitudinal slot that is essentially parallel to a direction of carriage travel, wherein the rail section can connect two misaligned rails.

In selected embodiments, the rail section comprises at least one transverse slot that is essentially orthogonal to the direction of carriage travel. A first transverse slot may partially intersect the rail section in a first direction and a second transverse slot may partially intersect the rail section in a second direction.

In selected embodiments, the rail section is made from a material selected from the group consisting of a metal and a polymer. In selected embodiments, the rail section may be made of an elastomer.

In selected embodiments, the carriage includes roller wheels to provide that the carriage can be transported on the rail section, and the rail section includes tracks for each of the roller wheels. The rail section may comprise at least one longitudinal slot for each of the tracks. The longitudinal slot may be situated such that a force from one of the roller wheels riding on one of the tracks tends to narrow the longitudinal slot.

In a second general aspect, a rail section on which a carriage can be transported is made from an elastomer, wherein the rail section can connect two misaligned rails. The rail section may be made of polyurethane.

In a third general aspect, a rail section on which a carriage can be transported comprises a body having proximal and distal ends that include fittings for connecting the rail section to respective first and second rails. The body has at least two longitudinal slots that are essentially parallel to a direction of carriage travel. The body further has multiple transversal slots at essentially regular intervals. A first group of the transverse slots partially intersects the rail section in a first direction and a second group of the transverse slots partially intersects the rail section in a second direction, wherein the rail section can overcome a misalignment between the first and second rails.

Embodiments of the invention may provide any or all of the following advantages. Improved connection between rail sections. Providing connection of misaligned rail sections. Providing convenient implementation of a continuous rail passing through several modular work stations.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
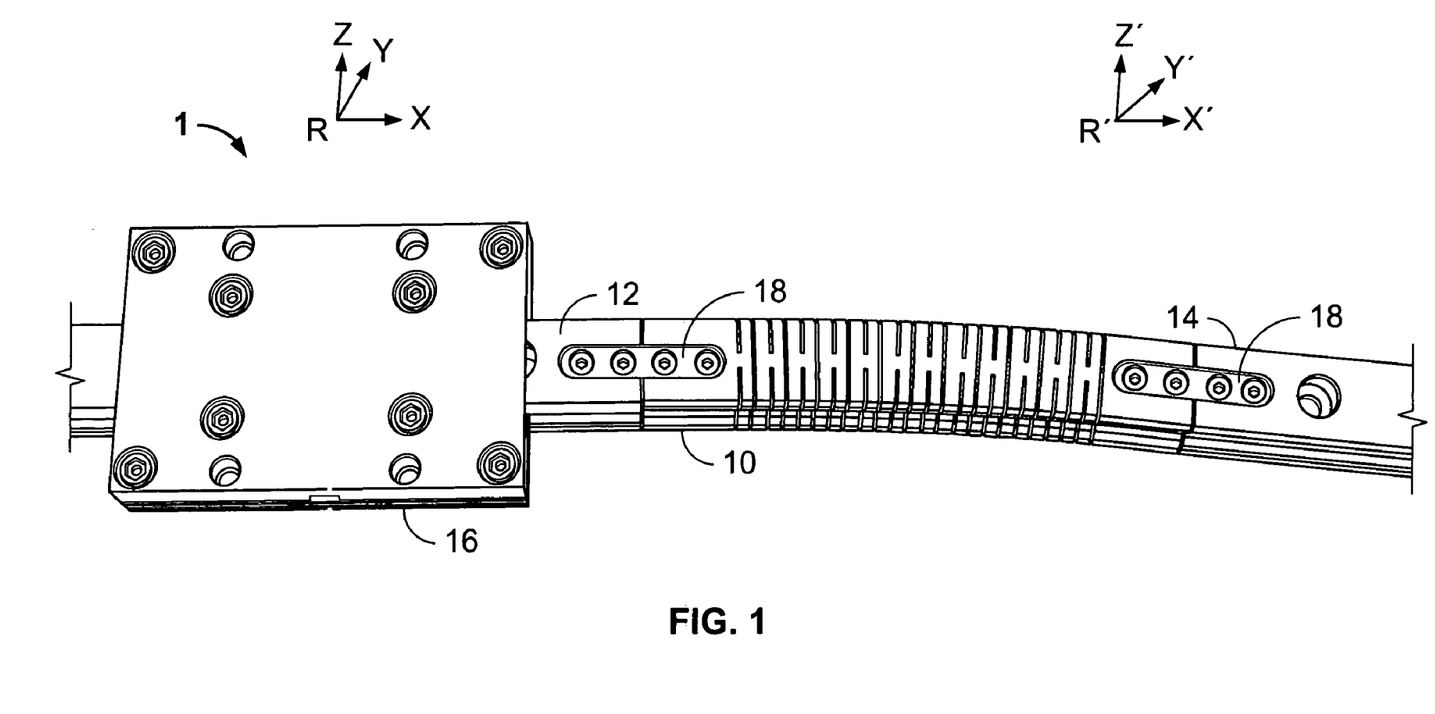
FIG. 1 is an elevated view of a system including a flexible rail section.

FIG. 1 shows a selected portion of a system 1 that may be part of a conveyor application for transporting work pieces on top of carriages during manufacturing. The system 1 includes a flexible rail section 10 that at one of its ends is connected to a fixed rail 12, and at the other of its ends is connected to another fixed rail 14. A carriage 16 is mounted on the rails in the system 1. For clarity, the carriage 16 is presently not carrying a work piece. The flexible rail section 10 is connected to the fixed rails 12 and 14 by respective fittings 18.

The fixed rails 12 and 14 are misaligned. For purposes of describing the misalignment there is introduced a coordinate system R for the fixed rail 12 (having mutually orthogonal axes x, y and z) and a coordinate system R' (having mutually orthogonal axes x', y' and z') for the fixed rail 14. The carriage may travel along the rails in either direction, such as from its current position on fixed rail 12 over the flexible rail section 10 and onto the fixed rail 14. In this example, the carriage travel direction is essentially parallel to the x axis on fixed rail 12 and to the x' axis on fixed rail 14. This and other examples of misalignment will be discussed below.

Figure 2:
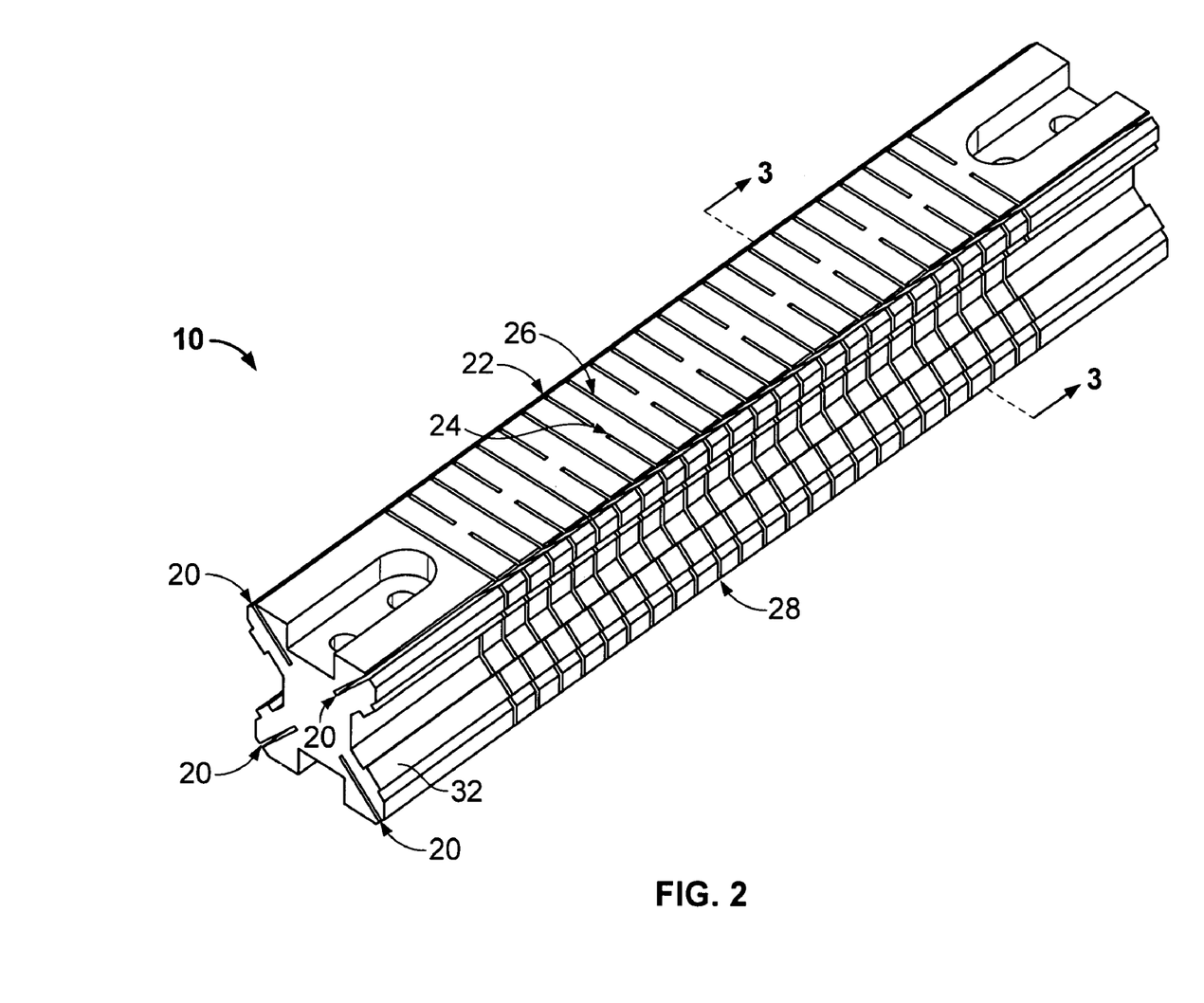
FIG. 2 is an elevated view of the flexible rail section shown in FIG. 1.

FIG. 2 shows the flexible rail section 10. The flexible rail section 10 has at least one longitudinal slot 20, and in this example four longitudinal slots 20. The slot(s) 20 may run throughout the entire length of the flexible rail section 10 or a portion thereof. The longitudinal slot(s) may provide rail section flexibility that allows the flexible rail section 10 to connect two misaligned rails. For example, the longitudinal slot(s) may provide that the carriage does not get stuck at a bend in the flexible rail section.

The flexible rail section 10 may have at least one transverse slot. Examples of transverse slots include lateral slots and vertical slots. A lateral slot may begin on either side of the flexible rail section 10, such as the exemplary lateral slots 22 and 24. In FIG. 2, the lateral slot 22 partially intersects the flexible rail section 10 from the left side and the lateral slot 24 partially intersects the flexible rail section 10 from the right side. It may therefore be said that the two slots 22 and 24 intersect the flexible rail section in first and second directions that are opposite to each other. Lateral slots from opposite directions may be located directly across the flexible rail section 10 from each other, as is the case with the exemplary lateral slots 22 and 24.

A vertical slot may begin on either the top or the bottom of the flexible rail section 10, such as the exemplary vertical slots 26 and 28. In FIG. 2, the vertical slot 26 partially intersects the flexible rail section 10 from the top side and the vertical slot 28 partially intersects the flexible rail section 10 from the bottom side. Similarly to the slots 22 and 24, it may therefore be said regarding the two slots 26 and 28 that they intersect the flexible rail section in first and second directions that are opposite to each other. Vertical slots from opposite directions may be located directly across the flexible rail section 10 from each other, as is the case with the exemplary vertical slots 26 and 28.

Two or more transversal slots may intersect the flexible rail section 10 in directions that are orthogonal to each other. Consider, for example, the lateral slot 22 (intersecting the flexible rail section from the left side) and the vertical slot 26 (intersecting the flexible rail section from the top). These two directions are at a 90 degree angle, or orthogonal, to each other. Similarly, the lateral slot 24 and the vertical slot 28 intersect the flexible rail section in orthogonal directions because the former intersects the flexible rail section from the right side and the latter from the bottom.

Some embodiments, such as the one shown here, may have multiple transverse slots distributed along the flexible rail section. The transverse slots may be distributed in a periodic pattern. For example, the periodic pattern may comprise a pair of lateral slots directly across the flexible rail section from each other followed by a pair of vertical slots directly across the flexible rail section from each other.

Figure 3:
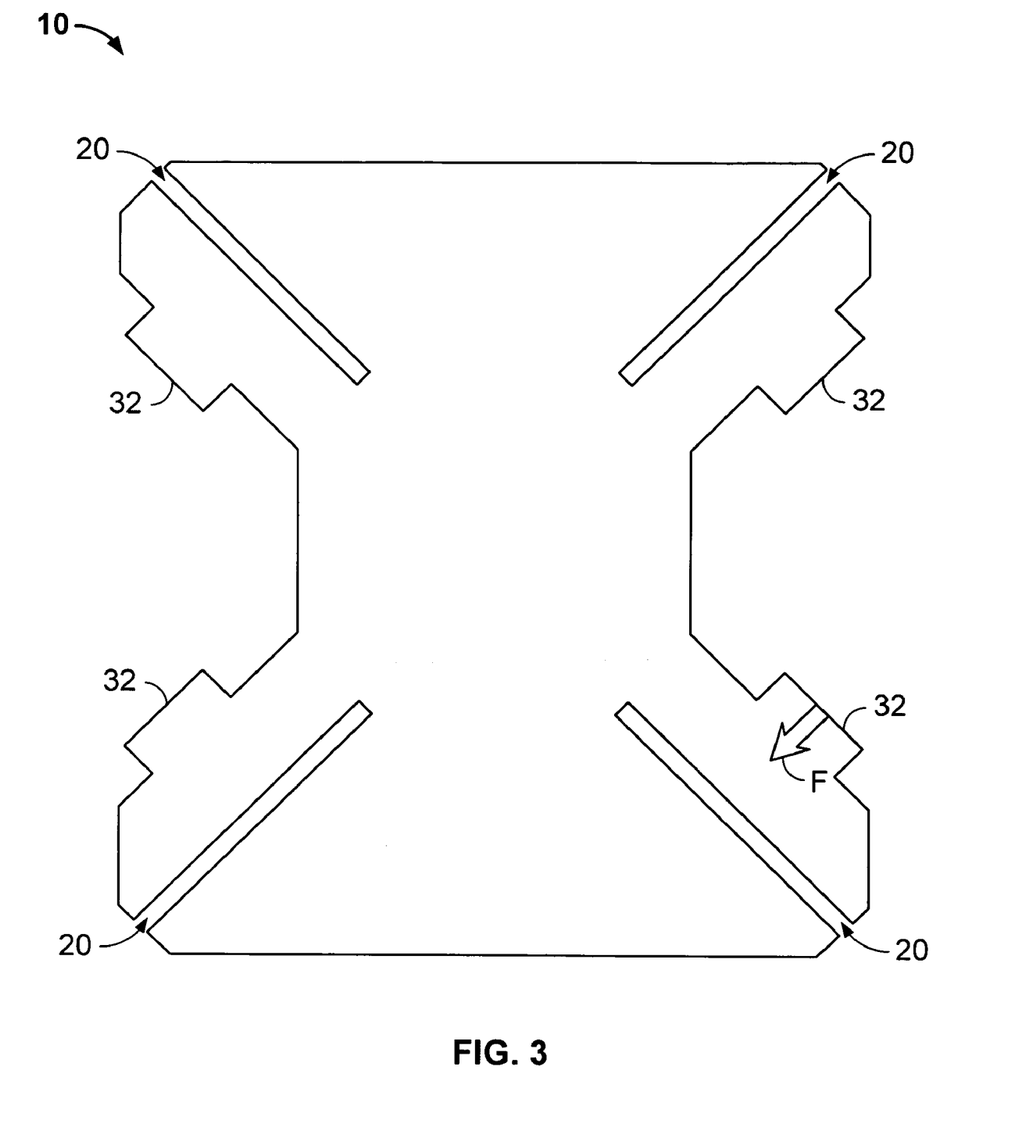
FIG. 3 is a cross section of the flexible rail section shown in FIG. 2.

FIG. 3 shows a cross section of the flexible rail section 10. This exemplary flexible rail section has four longitudinal slots 20. The longitudinal slots may be symmetrically distributed on the flexible rail section as they are here. The profile of this flexible rail section is configured to receive a carriage 16 that has multiple roller wheels that guide its travel on the rail. Particularly, the flexible rail section 10 has four tracks 32, wherein at least one of the roller wheels can ride on each of the tracks 32. The flexible rail section may have one longitudinal slot 20 for each of the tracks 32, as in the present example. Having more than one roller wheel riding on each of the tracks, e.g., one wheel toward the front of the carriage and another toward the back, may provide more stable and reliable travel.

A roller wheel riding on the track 32 may exert a force F on the track, for example due to gravity. The shown direction of the force F is only an example. Here, the slots 20 are positioned so that the force F tends to narrow the longitudinal slot 20. Whether the force F actually narrows the slot 20 and if so, to what extent, depends on the circumstances of the particular embodiment. Thus, any or all of the slots 20 may allow a deformation of the flexible rail section, which may accommodate carriage travel from one rail to another, misaligned, rail. Particularly, the slots 20 may allow a moderate deformation of the track 32 that lets the carriage traverse a bend in the flexible rail section.

Figure 4A:
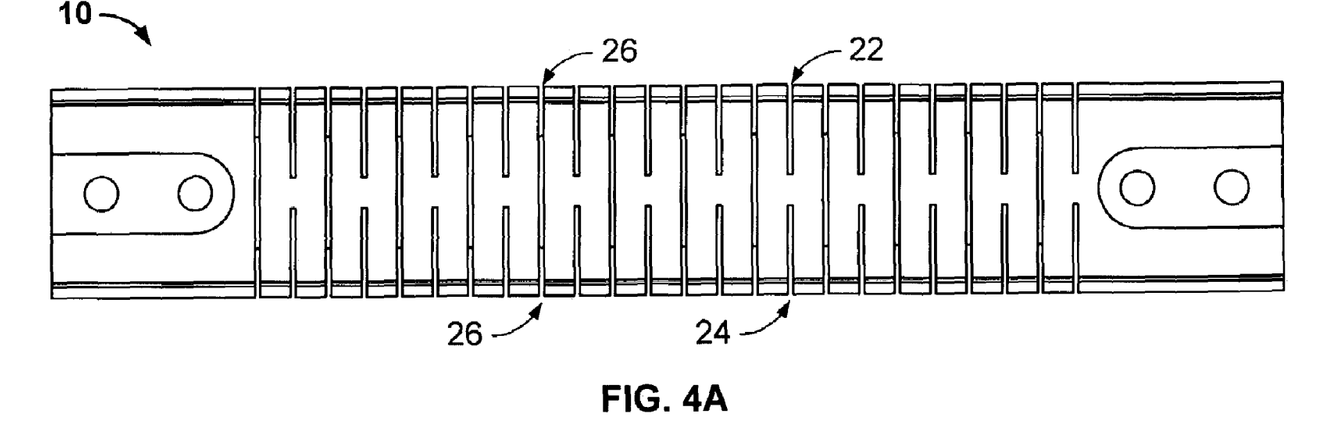
FIGS. 4A and 4B are top and bottom plane views, respectively, of the flexible rail section shown in FIG. 1.
Figure 4B:
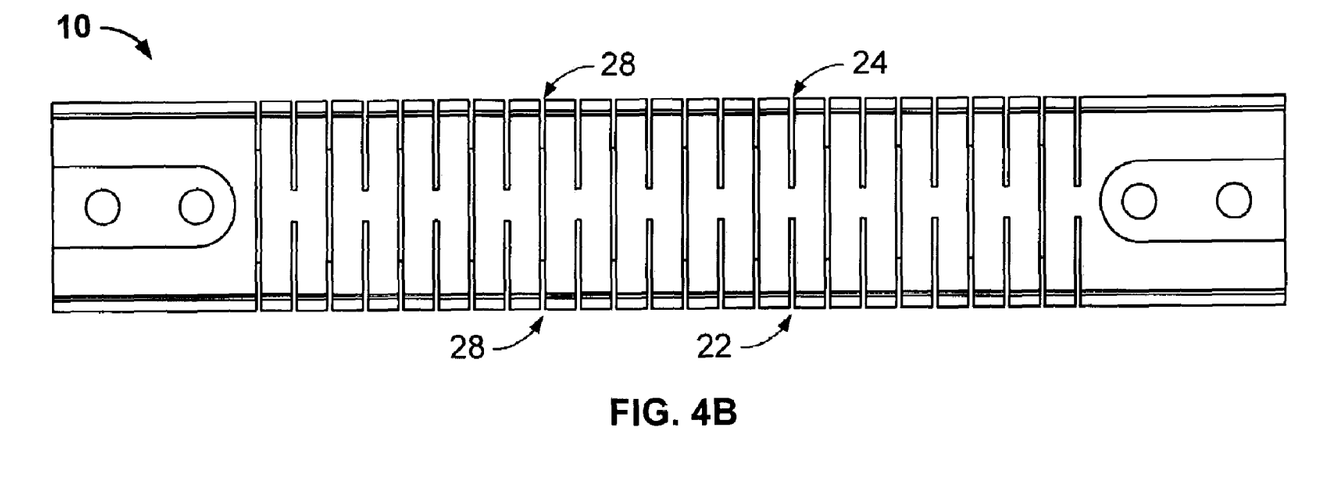

FIG. 4A is a top view of the flexible rail section 10. The lateral slots 22 and 24 are visible in this view, as is the vertical slot 26, which partially intersects the flexible rail section from the top. FIG. 4B, in turn, is a bottom view of the flexible rail section 10. The lateral slots 22 and 24 are visible in this view as well, as is the vertical slot 28, which partially intersects the flexible rail section from the bottom.

Referring again to FIG. 1, there may be different types of misalignment between the fixed rails 12 and 14. For example, a lateral misalignment may exist when the fixed rail 14 is parallel to the fixed rail 12, but laterally displaced from it. In terms of the coordinate systems R and R', lateral misalignment means that the axes (x, y, z) are parallel to the axes (x', y', z') and the R' system is displaced from the system R by an amount C, such that R'=R+C. An angular misalignment may exist when the two systems have one parallel axis, such that z=z', for example, and the other axes are not parallel. That is, in an angular misalignment the x' and y' axes may not be parallel with the x and y axes, respectively. A twisted misalignment, in turn, may exist when the carriage travel direction (such as the x and x' axes) are parallel, but the other two axes are not parallel in the two systems. That is, in a twisted misalignment the y' and z' axes may not be parallel with the y and z axes, respectively. Combinations of lateral, angular and twisted misalignment may occur.

Embodiments of the flexible rail section may be manufactured from different materials. For example, the flexible rail section may be made of metal. Metal embodiments may benefit from having multiple transversal slots distributed along the flexible rail section. A flexible metal rail section may be manufactured by any suitable metal fabrication process, such as an extrusion process, a grinding process, a molding process, a milling process or a welding process. As another example, the flexible rail section may be manufactured from a polymer, such as Acetal (polyoxymethylene). As yet another example, the flexible rail section may be made of a suitable elastomer. One example of such a material is urethane, including polyurethane resin, polyurethane rubber, and combinations thereof. Another example of a flexible rail section made from an elastomer will be described below with reference to FIG. 8.

Figure 5:
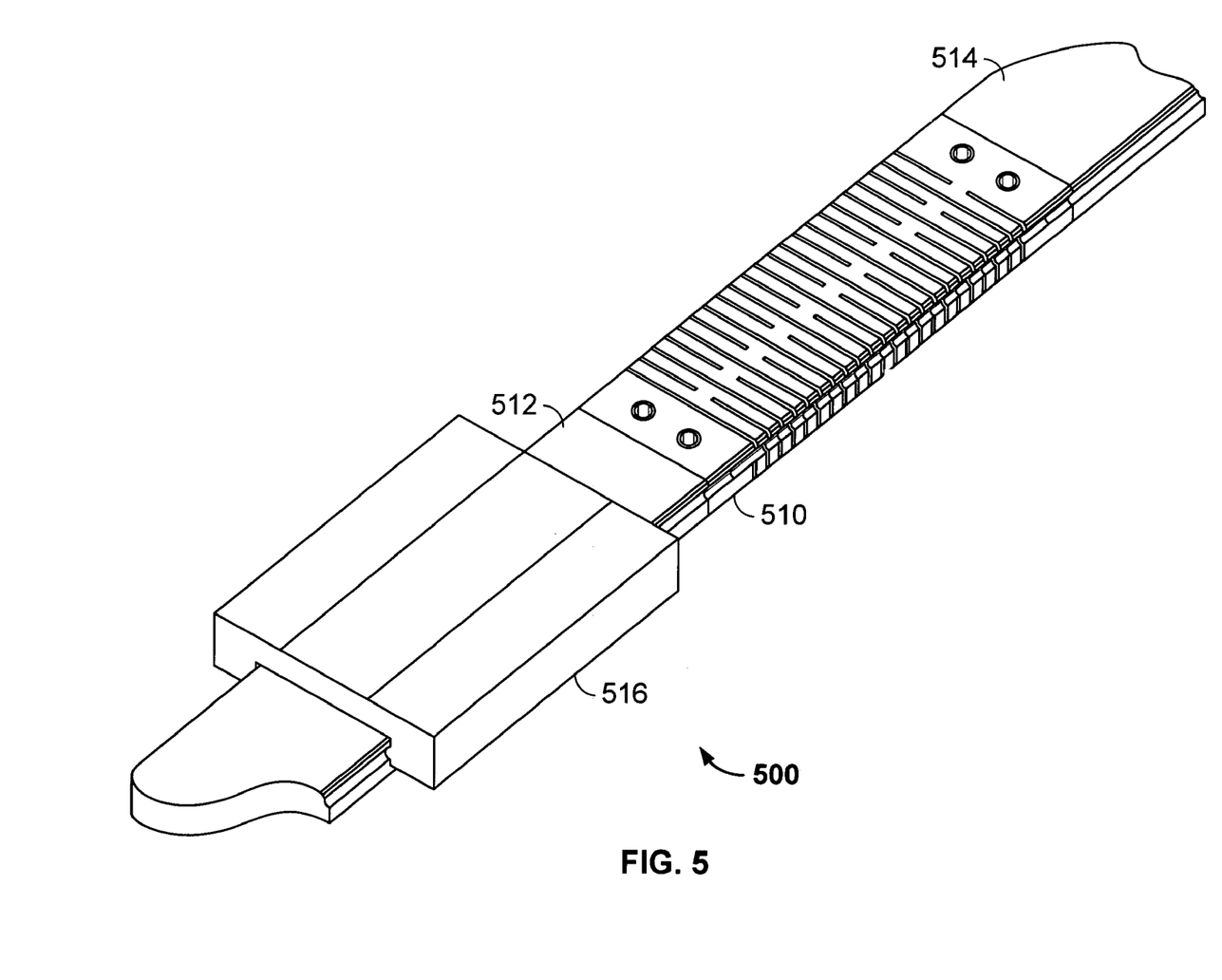
FIG. 5 is an elevated view of another system including a flexible rail section.

FIG. 5 shows a selected portion of a system 500 that may be part of a conveyor application for transporting work pieces on top of carriages during manufacturing. The system 500 includes a flexible rail section 510 that at one of its ends is connected to a fixed rail 512, and at the other of its ends is connected to another fixed rail 514. A carriage 516 is mounted on the rails in the system 500. For clarity, the carriage 516 is presently not carrying a work piece.

One difference between the system 500 and the system shown in FIG. 1 is that the carriage 516 is of the well known "ball slider" type. This means that the carriage 516 includes multiple balls movable in an endless path to provide that the carriage can be transported on the rail. Different types of ball slider mechanisms may be used.

Figure 6:
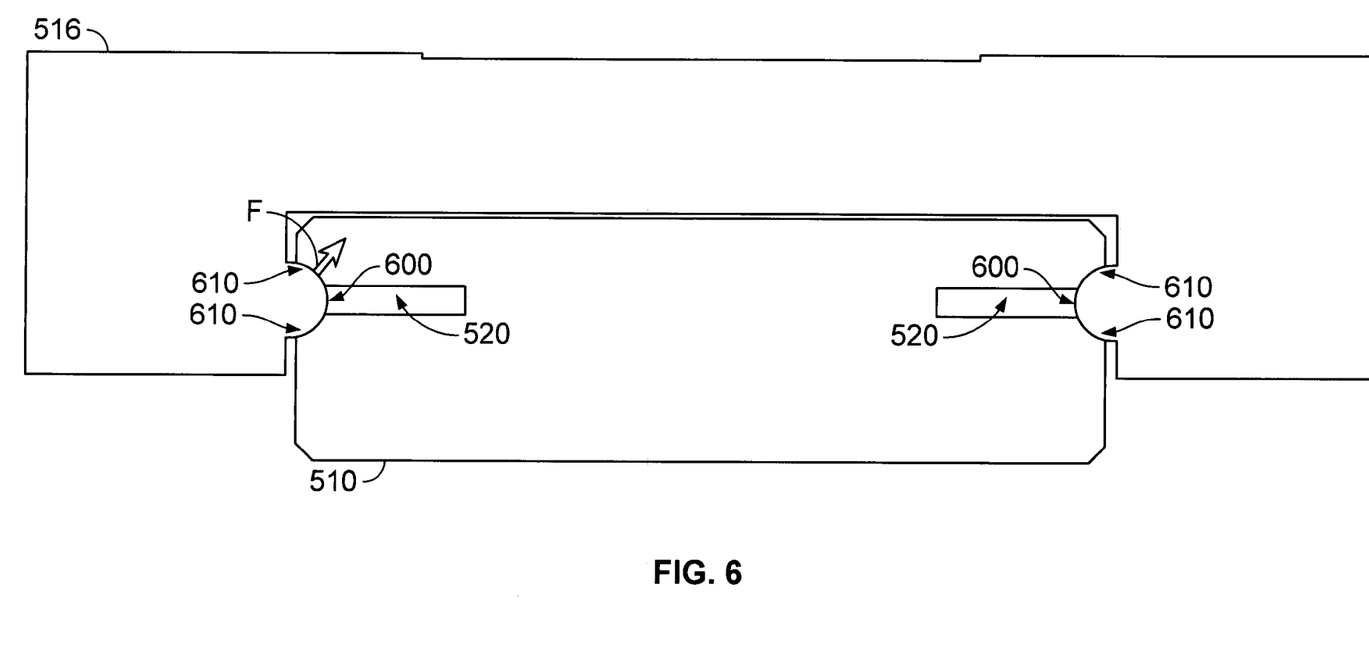
FIG. 6 shows a carriage placed on the flexible rail section shown in FIG. 5.

With reference also to FIG. 6, the carriage 516 is shown with semicircular silhouettes 600 abutting the flexible rail section 510 on each side. These silhouettes 600 represent the curvature of the multiple balls that can travel in the endless path inside the carriage.

The flexible rail section 510 may include at least one longitudinal slot 520. In some embodiments, such as the one shown, the flexible rail section includes one longitudinal slot on each side. The longitudinal slot 520 may include at least one curved surface 610 that fits the curvature of the balls. Here, each of the slots 520 includes two curved surfaces 610 that presently abut the silhouettes 600.

Similarly to the roller wheels described above, the multiple balls in the carriage 516 may exert a force F on one or more of the curved surfaces 610, for example due to gravity. The shown direction of the force F is only an example. The force F may tend to widen the longitudinal slot 520. Whether the force F actually widens the slot 20 and if so, to what extent, depends on the circumstances of the particular embodiment. Thus, any or all of the slots 520 may allow a deformation of the flexible rail section, which may accommodate carriage travel from one rail to another, misaligned, rail. Particularly, the slot(s) 520 may allow a moderate deformation of the flexible rail section that lets the carriage traverse a bend in the flexible rail section.

Figure 7:
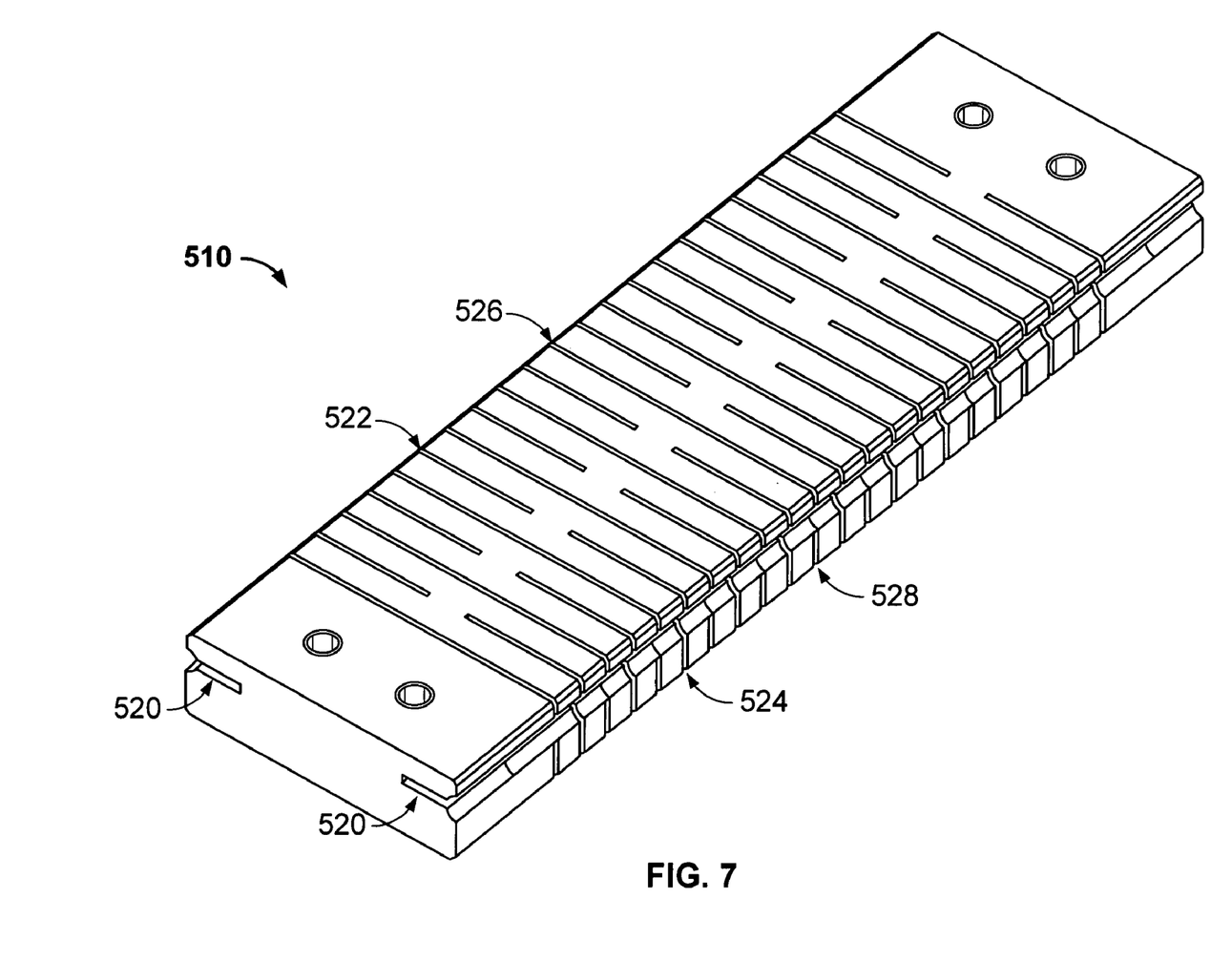
FIG. 7 is an elevated view of the flexible rail section shown in FIG. 5.

With reference also to FIG. 7, the flexible rail section 510 may include at least one transversal slot. The above description of transversal slot(s) with regard to the flexible rail section 10 applies analogously to transversal slot(s) in the flexible rail section 510. For example, the flexible rail section may have a lateral slot 522 partially intersecting the flexible rail section from the left side, a lateral slot 524 partially intersecting the flexible rail section from the right side, a vertical slot 526 partially intersecting the flexible rail section from the top, and a vertical slot 528 partially intersecting the flexible rail section from the bottom. Accordingly, the above description of the slots 22–28 applies analogously to the slots 522–528.

Figure 8:
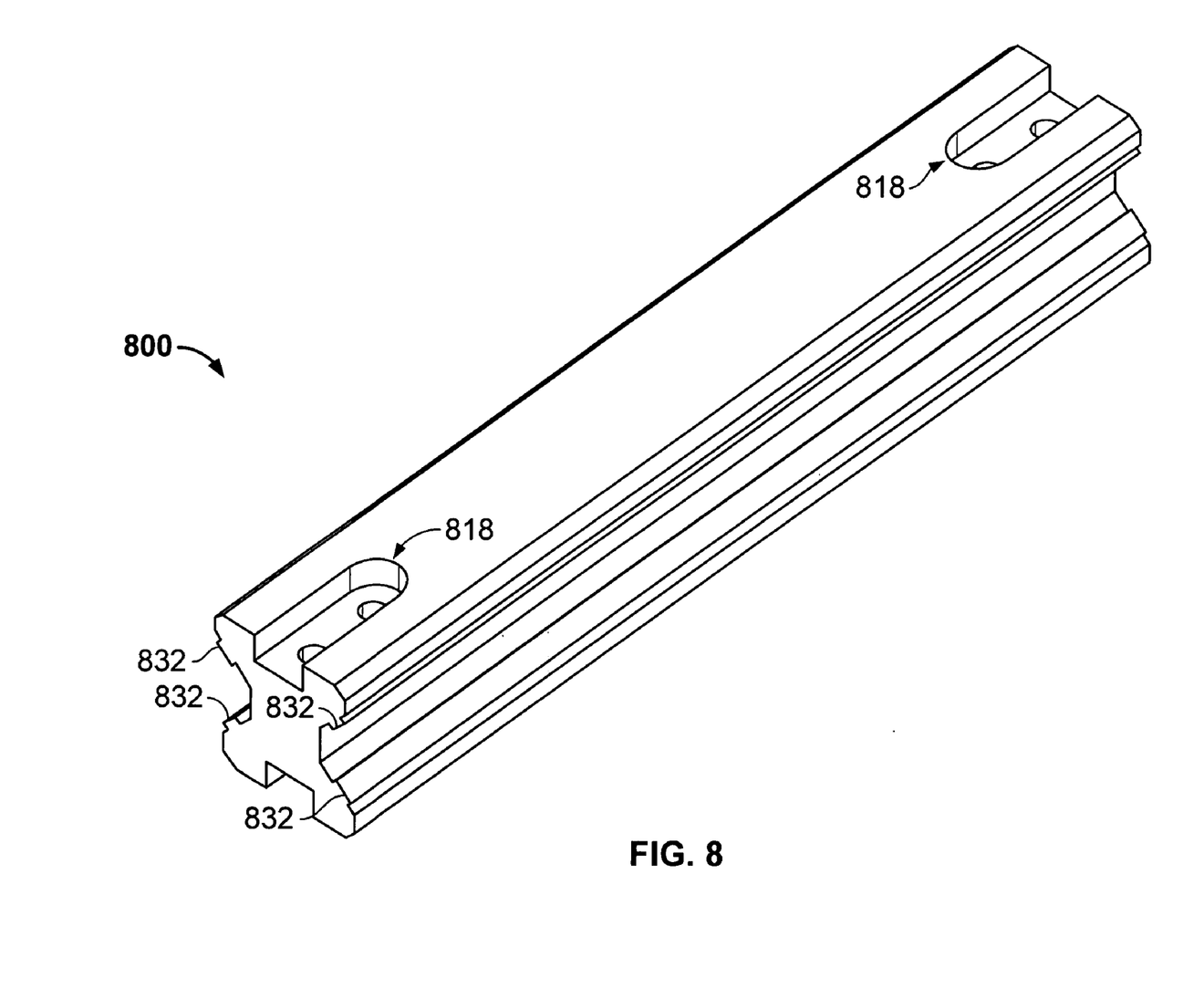
FIG. 8 is an elevated view of a flexible rail section.

FIG. 8 shows a flexible rail section 800 according to an embodiment of the invention. The flexible rail section 800 can connect misaligned rails, such as the exemplary fixed rails 12 and 14 (FIG. 1), for example using fittings 818 at proximal and distal ends thereof. The flexible rail section 800 may be made of an elastomer to provide flexibility for connecting misaligned rails. For example, it can be made of a urethane material, such as polyurethane resin or polyurethane rubber. A flexible urethane rail section may be manufactured by any suitable process, such as by casting or injection molding.

In implementations of the flexible rail section 800 that are made from sufficiently flexible materials, the longitudinal slots, or transverse slots, or both, that were described above may be omitted. Accordingly, such implementations of the flexible rail section may have a profile that is essentially the same as that of fixed rails 12 and 14. That is, when the misaligned rails have an essentially common profile, the flexible rail section may have that common profile.

The flexible rail section 800 may include one or more tracks 832, upon which roller wheels of a carriage (not shown) may travel, similarly to the tracks 32 in flexible rail section 10 described above. In other embodiments, the flexible rail section may be configured to receive a ball slider carriage such as the one shown in FIGS. 5 and 6.

A number of embodiments of the invention have been described. Nevertheless, it will be understood that various modifications may be made without departing from the spirit and scope of the invention. Accordingly, other embodiments are within the scope of the following claims.

What is claimed is:

1. A rail section on which a carriage is guided comprising:
   A body,
   Wherein the rail section forms multiple transverse slots distributed along the body,
   Wherein the multiple transverse slots are essentially orthogonal to the direction of carriage travel,
   Wherein the multiple transverse slots includes a first set of slots that cut only partially into the body in a first direction and a second set of slots that cut only partially into the body in a second direction, wherein the first direction is not parallel to the second direction,
   Wherein the first set of slots and the second set of slots provide flexibility for the rail section.

2. The rail section of claim 1, wherein the rail section forms a longitudinal slot that is essentially parallel to a direction of carriage travel, wherein the longitudinal slot extends substantially throughout an entire length of the rail section.

3. The rail section of claim 1, made from a material selected from the group consisting of: a metal, a polymer, Acetal, an elastomer, and polyurethane.

4. The rail section of claim 1, wherein the carriage includes multiple balls movable in an endless path to provide that the carriage can be transported on the rail section.

5. The rail section of claim 4, wherein the longitudinal slot includes at least one curved surface that fits a curvature of the balls.

6. The rail section of claim 1, wherein the carriage includes roller wheels to provide that the carriage can be transported on the rail section, and wherein the rail section includes tracks for each of the roller wheels.

7. The rail section of claim 6, wherein the rail section forms longitudinal slots for each of the tracks, wherein the longitudinal slots are situated such that a force from one of the roller wheels riding on one of the tracks tends to narrow the longitudinal slot.

8. The rail section of claim 1, wherein the first direction is substantially perpendicular to the second direction.

9. A rail section on which a carriage is guided, the rail section comprising:
   A longitudinal slot that is essentially parallel to a direction of carriage travel;
   And
   Multiple transverse slots distributed along the rail section,
   Wherein the multiple transverse slots are distributed in a periodic pattern comprising two lateral slots directly across the rail section from each other followed by two vertical slots directly across the rail section from each other,
   Wherein the rail section can connect two misaligned rails.

10. A rail section comprising a body, the body consisting of a single part,
   Wherein the body provides a path on which a carriage is guided,
   Wherein the body forms a set of transverse slots, Wherein transverse slots in the set of slots are substantially non-parallel to a direction of travel of the carriage, Wherein the set of transverse slots includes a first set of slots that extend only partially into the body in a first direction and a second set of slots that extend only partially into the body in a second direction, wherein the first direction is not parallel to the second direction, Wherein the first set of slots and the second set of slots provide flexibility for the rail section.

11. The rail section of claim 10, wherein the set of transverse slots includes vertical slots and lateral slots.

12. The rail section of claim 10, wherein each of the transverse slots is one of a pair of transverse slots directly across the rail section from each other.

13. The rail section of claim 12, wherein each pair vertical slots is adjacent to a pair of lateral slots, wherein each pair of lateral slots includes two lateral slots directly across the rail section from each other.

14. The rail section of claim 10, wherein the set of transverse slots forms a repeating pattern.

15. The rail section of claim 10, wherein the set of transverse slots is symmetrically distributed on the rail section.

16. The rail section of claim 10, wherein the transverse slots are orthogonal to the direction of travel of the carriage.

17. The rail section of claim 10, wherein the body is made from an elastomer.

18. The rail section of claim 10, wherein the first direction is substantially perpendicular to the second direction.

19. A system comprising:

A first fixed rail, wherein a carriage is guided along a first longitudinal direction of the first fixed rail A second fixed rail, wherein the carriage is guided along a second longitudinal direction of the second fixed rail, wherein the first fixed rail is misaligned with the second fixed rail; and A flexible rail comprising a body consisting of a single part, Wherein the body forms a set of transverse slots, Wherein transverse slots in the set of transverse slots are substantially non-parallel to a direction of travel of the carriage, Wherein the set of transverse slots includes a first set of slots that extend only partially into the body in a first direction and a second set of slots that extend only partially into the body in a second direction, wherein the first direction is not parallel to the second direction.

Wherein the first set of slots and the second set of slots provide flexibility for the rail section, Wherein the flexible rail includes a first end connected to the first fixed rail and a second end connected to the second fixed rail, Wherein the carriage is guided between the first fixed rail and the second fixed rail along a longitudinal path of the flexible rail section provided by the body.

20. The system of claim 19, wherein the first fixed rail is parallel to the second fixed rail.

21. The system of claim 19, wherein the first fixed rail, the second fixed rail and the flexible rail section have a common cross-section relative to a path of travel of the carriage.

22. The system of claim 19, wherein the transverse slots are orthogonal to the direction of travel of the carriage.

23. The system of claim 19, wherein the first direction is substantially perpendicular to the second direction.

\* \* \* \* \*